US006189403B1

United States Patent
Berninger

(10) Patent No.: US 6,189,403 B1
(45) Date of Patent: Feb. 20, 2001

(54) ROBOT ARM

(75) Inventor: Alwin Berninger, Augsburg (DE)

(73) Assignee: Kuka Roboter GmbH (DE)

( * ) Notice: Under 35 U.S.C. 154(b), the term of this patent shall be extended for 0 days.

(21) Appl. No.: 09/292,615

(22) Filed: Apr. 15, 1999

(30) Foreign Application Priority Data

Apr. 17, 1998 (DE) .............................................. 198 17 607

(51) Int. Cl.⁷ .................................................. B25J 18/00
(52) U.S. Cl. .......................... 74/490.02; 414/918; 901/50
(58) Field of Search ......................... 74/490.02; 901/23, 901/27, 50; 439/501; 414/918

(56) References Cited

U.S. PATENT DOCUMENTS

| 5,115,690 | * | 5/1992 | Torii et al. ............................... 901/27 |
| 5,411,443 | | 5/1995 | Meier . |
| 5,703,330 | * | 12/1997 | Kujawski ........................... 174/72 A |
| 6,027,679 | * | 2/2000 | O'Brien et al. .................. 264/272.14 |

FOREIGN PATENT DOCUMENTS

| 0 407 616 | | 1/1991 | (EP) . |
| 0 891 842 | | 1/1999 | (EP) . |
| 1-289042 | * | 11/1989 | (JP) . |

* cited by examiner

*Primary Examiner*—David A. Bucci
*Assistant Examiner*—William C Joyce
(74) *Attorney, Agent, or Firm*—Paul Vincent

(57) ABSTRACT

In order to guide a cable for a robot in a protective fashion while facilitating simple insertion of protected cables in a robot arm, in particular a robot arm bearing a hand arbor motor, having a cable guide channel extending substantially along the robot arm and having a sideward opening along its entire length.

5 Claims, 1 Drawing Sheet

ROBOT ARM

This application claims Paris Convention priority of DE 198 17 607.4 filed Apr. 17, 1998 the complete disclosure of which is hereby incorporated by Reference.

BACKGROUND OF THE INVENTION

The invention concerns a robot arm, in particular a robot arm bearing a hand arbor motor.

Robots have cables or cable bundles normally guided outside of the arm member. They can thereby be bothersome and are subject to external disruptions. On has therefore proposed guiding the cables within the arm member. This has the disadvantage that the cables have to be threaded through the arm or its housing and there are problems associated with length compensation.

It is therefore the underlying purpose of the invention to configure a robot arm in such a fashion that the cables are disposed in a protected manner and can be guided into their protected position in a simple fashion.

SUMMARY OF THE INVENTION

This purpose is achieved in accordance with the invention with a robot arm of the above mentioned kind using a cable guide channel which extends substantially along the robot arm and which has a sideward opening along its entire length.

A preferred embodiment provides that the sideward opening travels in an S-shaped fashion, wherein, in particular, the cable guide channel defines a flat cavity as a storage volume for the cable or cable bundles in the cable channel.

Additional preferred embodiments of the invention provide that the cable guide channel travels from one longitudinal side of the robot arm to the other longitudinal side, wherein, in particular, the cable guide channel extends from a front region of a longitudinal side of the robot arm to a rear region of a longitudinal side of the robot arm. In this fashion, the cable channel provides optimum entrance and exit points with regard to feeding the cable from the base of the robot as well as with regard to passage of the individual cables to the individual motors, in particular the hand arbor motor of the corresponding robot arm but also the motor pivoting this robot arm.

An additional preferred configuration of the invention provides that the width of the sideward opening is less than the corresponding transverse dimension of the cable guide channel. In this manner one prevents the cable from unintentionally slipping out of the cable guide channel, since the sideward opening is narrowed compared to the cross section of the cable channel to define confining undercut protrusions or shoulders at which the cable, in particular in the event that the cable channel is S-shaped, at least locally seats to thereby prevent an escape out of the cable guide channel.

The invention generally effects a combined inward and outward cable guide having a storage region for excess cable lengths in the arm housing such that substantially standardized cables can be utilized. In addition, simple insertion and simple accessibility to the cable is effected, in particular e.g. in the event of exchange.

Further advantages and features of the invention can be extracted from the claims and the following description in which an embodiment of the invention is described more closely with reference to the drawing.

DESCRIPTION OF THE PREFERRED EMBODIMENT

Figures 1, 2:
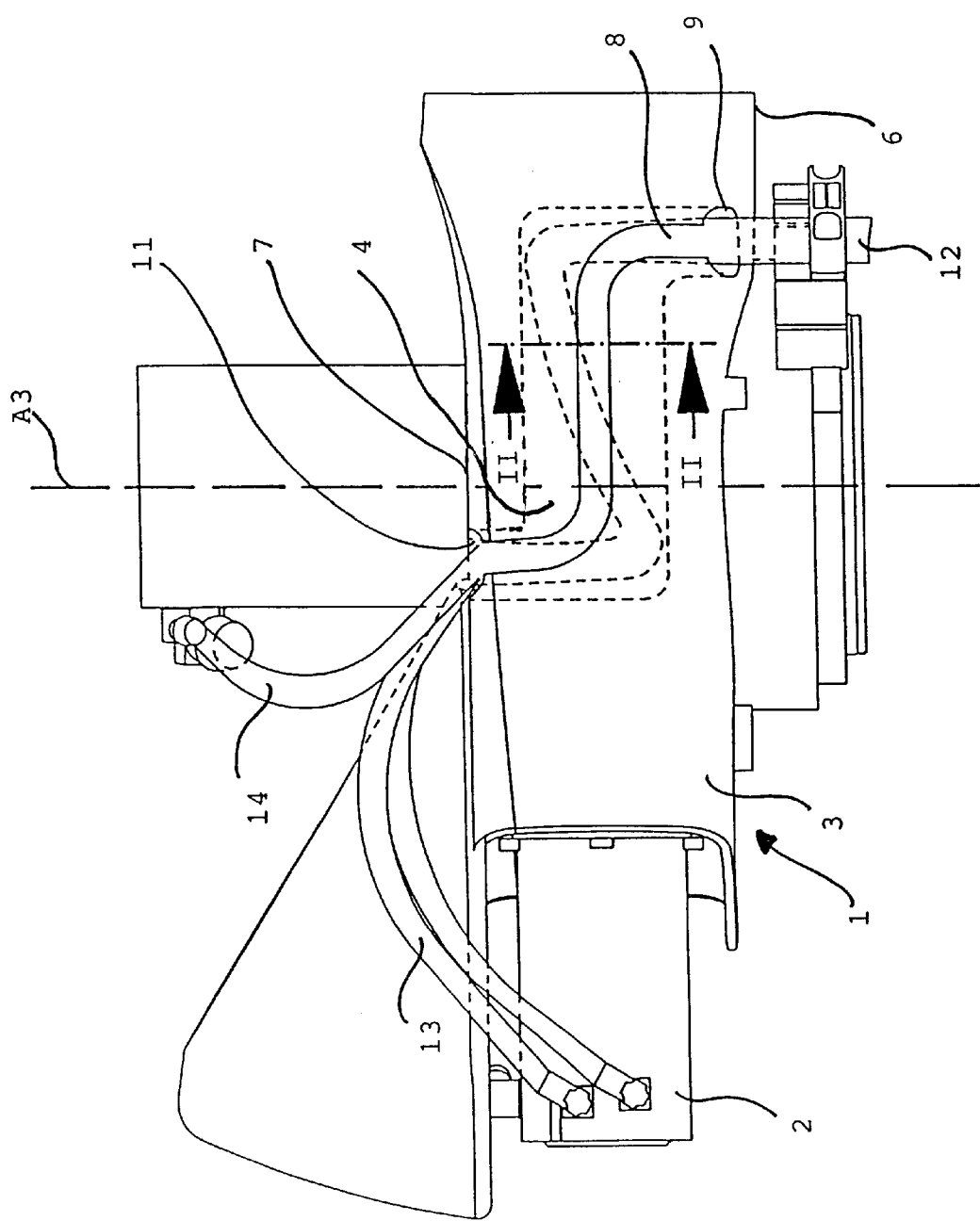
FIG. 1 shows a plan view of a robot arm in accordance with the invention having a cable guide channel.
FIG. 2 shows a cut corresponding to II—II of FIG. 1.

The robot arm 1 configured in accordance with the invention and shown in the figures can be pivoted about the horizontal axis A3 of a robot and bears hand arbor motors 2. A cable guide channel 4 is disposed on the upper side 3 of the robot arm within the housing thereof and extends from the front region facing away from the hand arbor motor 2 of one longitudinal side 6 of the robot arm 1 in an S-shaped fashion towards the rear, e.g. towards the hand arbor motors 2 and the other side 7 of the robot arm. The principal extension direction of the channel 4 runs substantially in the longitudinal direction of the robot arm 1. The cable guide channel 4 has a slotted opening 8 on its upper side which extends along the entire length of the cable guide channel 4. The opening 8 has widened ends 11, 9 at the ends of the cable guide channel 4 at the longitudinal sides 6, 7.

Cables 13, 14 passing from the base of the robot to the hand arbor motors 2 as well as to the motors 12 moving the robot arm 1 about the axis A3 can be easily and comfortably introduced sidewardly through the slot 8 into the cable guide channel. Since the transverse dimensions of the cable guide channel 4 are larger that those of the cables 13, 14 and/or of the overall height of these cables, the cable guide channel can define a storage region to accept and compensate for excess cable lengths. The cables nevertheless remain protected, seated in the cable guide channel 4.

I claim:

1. A robot arm comprising:

means defining an S-shaped cable guide channel, said S-shaped cable guide channel extending substantially along the robot arm, said S-shaped cable guide channel having a transverse size; and means defining a sideward opening communicating with said S-shaped cable guide channel, said sideward opening extending along an entire length of said S-shaped cable guide channel, said sideward opening having a width which is less than said transverse size of said S-shaped cable guide channel.

2. The robot arm of claim 1, further comprising a hand arbor motor mounted to the robot arm.

3. The robot arm of claim 1, wherein said S-shaped cable guide channel extends from a first longitudinal side of the robot arm to a second longitudinal side of the robot arm.

4. The robot arm of claim 3, wherein said S-shaped cable guide channel extends from a front region of said first longitudinal side of the robot arm to a rear region of said second longitudinal side of the robot arm.

5. The robot arm of claim 1, wherein said S-shaped cable guide channel has a cross section which is larger than a cross section of a cable accepted within said cable guide channel.

* * * * *